United States Patent
Sakata et al.

(10) Patent No.: US 10,655,007 B2
(45) Date of Patent: May 19, 2020

(54) POLYALKYLENE TEREPHTHALATE RESIN COMPOSITION

(71) Applicants: WinTech Polymer Ltd., Tokyo (JP); KANEKA CORPORATION, Osaka-shi, Osaka (JP)

(72) Inventors: Kouichi Sakata, Fuji (JP); Shinya Yamada, Fuji (JP); Nobuhiro Yamamoto, Takasago (JP); Tetsuro Yamamoto, Takasago (JP); Yoshiaki Matsuoka, Takasago (JP); Toyohisa Fujimoto, Takasago (JP)

(73) Assignees: POLYPLASTICS CO., LTD., Tokyo (JP); KANEKA CORPORATION, Osaka (JP)

( * ) Notice: Subject to any disclaimer, the term of this patent is extended or adjusted under 35 U.S.C. 154(b) by 145 days.

(21) Appl. No.: 15/539,958

(22) PCT Filed: Dec. 14, 2015

(86) PCT No.: PCT/JP2015/084876
§ 371 (c)(1),
(2) Date: Jun. 26, 2017

(87) PCT Pub. No.: WO2016/104201
PCT Pub. Date: Jun. 30, 2016

(65) Prior Publication Data
US 2017/0342260 A1   Nov. 30, 2017

(30) Foreign Application Priority Data

Dec. 26, 2014  (JP) ................ 2014-265294

(51) Int. Cl.
*C08L 67/02*   (2006.01)
*B29C 45/14*   (2006.01)
(Continued)

(52) U.S. Cl.
CPC .............. *C08L 67/02* (2013.01); *B29C 45/14* (2013.01); *C08K 3/00* (2013.01); *C08L 51/06* (2013.01);
(Continued)

(58) Field of Classification Search
None
See application file for complete search history.

(56) References Cited

U.S. PATENT DOCUMENTS

| 4,096,202 A | 6/1978 | Farnham et al. |
| 4,446,276 A | 5/1984 | Binsack et al. |
| 4,957,677 A * | 9/1990 | Katoh ............... B29C 45/14311 264/135 |
| 5,773,520 A * | 6/1998 | Bertelo ................. C08F 265/06 525/307 |

(Continued)

FOREIGN PATENT DOCUMENTS

| EP | 0185103 A1 | 6/1986 |
| EP | 0269324 A2 | 6/1988 |

(Continued)

OTHER PUBLICATIONS

International Search Report dated Feb. 16, 2016, issued in counterpart International Application No. PCT/JP2015/084876 (2 pages).

(Continued)

*Primary Examiner* — Vivian Chen
(74) *Attorney, Agent, or Firm* — Westerman, Hattori, Daniels & Adrian, LLP

(57) ABSTRACT

Disclosed are: a polyalkylene terephthalate resin composition comprising (A) a polyalkylene terephthalate resin and (B) an acrylic-based core-shell polymer which has an average particle size of 2 μm or greater and in which an amount of the core layer component is more than 80% by mass but less than 100% by mass relative to a total mass of the core layer component and a shell layer component; and a molded article which is obtained by molding the polyalkylene terephthalate resin composition.

10 Claims, 3 Drawing Sheets

(51) Int. Cl.
| | | |
|---|---|---|
| *C08K 3/00* | (2018.01) | |
| *C08L 51/06* | (2006.01) | |
| *B32B 27/30* | (2006.01) | |
| *B32B 15/08* | (2006.01) | |
| *B32B 3/02* | (2006.01) | |
| *B32B 27/20* | (2006.01) | |
| *B32B 27/18* | (2006.01) | |
| *B32B 27/36* | (2006.01) | |
| *B32B 15/04* | (2006.01) | |
| *B32B 3/26* | (2006.01) | |
| *B32B 15/09* | (2006.01) | |
| *B32B 27/06* | (2006.01) | |
| *B29C 45/16* | (2006.01) | |
| *B29C 45/00* | (2006.01) | |
| *B29K 709/00* | (2006.01) | |
| *B29K 705/00* | (2006.01) | |
| *C08L 33/06* | (2006.01) | |
| *C08L 33/10* | (2006.01) | |
| *C08L 33/04* | (2006.01) | |
| *C08L 33/12* | (2006.01) | |
| *C08L 33/08* | (2006.01) | |
| *C08L 67/03* | (2006.01) | |
| *C08L 51/00* | (2006.01) | |
| *B29K 67/00* | (2006.01) | |
| *C08K 3/013* | (2018.01) | |

(52) U.S. Cl.
CPC .......... *B29C 45/0001* (2013.01); *B29C 45/16* (2013.01); *B29C 45/1671* (2013.01); *B29C 45/1676* (2013.01); *B29K 2067/003* (2013.01); *B29K 2705/00* (2013.01); *B29K 2709/00* (2013.01); *B29K 2833/04* (2013.01); *B29K 2833/08* (2013.01); *B29K 2833/12* (2013.01); *B29K 2867/00* (2013.01); *B29K 2867/006* (2013.01); *B29K 2995/0012* (2013.01); *B29K 2995/0089* (2013.01); *B32B 3/02* (2013.01); *B32B 3/26* (2013.01); *B32B 15/04* (2013.01); *B32B 15/08* (2013.01); *B32B 15/09* (2013.01); *B32B 27/06* (2013.01); *B32B 27/18* (2013.01); *B32B 27/20* (2013.01); *B32B 27/30* (2013.01); *B32B 27/308* (2013.01); *B32B 27/36* (2013.01); *B32B 2264/02* (2013.01); *B32B 2264/025* (2013.01); *B32B 2264/0214* (2013.01); *B32B 2307/30* (2013.01); *B32B 2367/00* (2013.01); *B32B 2457/00* (2013.01); *B32B 2457/04* (2013.01); *C08J 2333/04* (2013.01); *C08J 2333/06* (2013.01); *C08J 2333/08* (2013.01); *C08J 2333/10* (2013.01); *C08J 2333/12* (2013.01); *C08J 2367/00* (2013.01); *C08J 2367/02* (2013.01); *C08J 2367/03* (2013.01); *C08K 3/013* (2018.01); *C08L 33/04* (2013.01); *C08L 33/06* (2013.01); *C08L 33/08* (2013.01); *C08L 33/10* (2013.01); *C08L 33/12* (2013.01); *C08L 51/003* (2013.01); *C08L 67/03* (2013.01); *C08L 2201/00* (2013.01); *C08L 2203/20* (2013.01); *C08L 2205/02* (2013.01); *C08L 2205/06* (2013.01); *C08L 2207/53* (2013.01); *Y10T 428/24777* (2015.01); *Y10T 428/254* (2015.01); *Y10T 428/263* (2015.01); *Y10T 428/2982* (2015.01); *Y10T 428/2989* (2015.01); *Y10T 428/2991* (2015.01); *Y10T 428/31681* (2015.04); *Y10T 428/31786* (2015.04)

(56) References Cited

U.S. PATENT DOCUMENTS

| | | | | |
|---|---|---|---|---|
| 6,033,748 | A | 3/2000 | Dunning et al. | |
| 8,142,888 | B2* | 3/2012 | Sakata | B29C 45/0001 428/325 |
| 8,142,900 | B2* | 3/2012 | Sakata | C08L 67/02 428/327 |
| 8,362,147 | B2* | 1/2013 | Yamada | C08F 265/00 525/81 |
| 8,404,763 | B2* | 3/2013 | Sakata | C08L 67/02 264/328.18 |
| 8,445,570 | B2* | 5/2013 | Sakata | C08K 5/29 524/195 |
| 8,530,555 | B2* | 9/2013 | Ohtake | C08K 5/29 524/195 |
| RE46,324 | E* | 2/2017 | Sakata | C08K 5/29 |
| 2001/0028130 | A1* | 10/2001 | Yagi | B29C 45/14065 264/255 |
| 2006/0041056 | A1* | 2/2006 | Sunagawa | C08L 67/02 525/7.4 |
| 2006/0079638 | A1* | 4/2006 | Matsushima | C08F 265/04 525/63 |
| 2008/0090961 | A1* | 4/2008 | Li | C08L 69/00 525/63 |
| 2008/0214731 | A1* | 9/2008 | Li | C08L 51/003 524/701 |
| 2009/0324977 | A1* | 12/2009 | Sakata | C08L 67/02 428/480 |
| 2010/0267891 | A1* | 10/2010 | Sakata | B29C 45/0001 524/523 |
| 2011/0092616 | A1* | 4/2011 | Sakata | C08L 67/02 523/506 |
| 2011/0098388 | A1 | 4/2011 | Sakata et al. | |
| 2011/0274932 | A1* | 11/2011 | Benten | B29C 45/1671 428/412 |
| 2012/0028063 | A1* | 2/2012 | Sakata | B29C 65/06 428/480 |
| 2012/0232200 | A1* | 9/2012 | Ohtake | C08K 5/29 524/195 |
| 2014/0000927 | A1* | 1/2014 | Hashimoto | H02G 5/005 174/68.2 |
| 2014/0058015 | A1* | 2/2014 | Yamada | C08K 3/22 523/435 |
| 2015/0302954 | A1* | 10/2015 | Hara | H05K 5/0047 174/68.2 |
| 2015/0368459 | A1* | 12/2015 | Yamanaka | C08L 67/03 524/504 |
| 2016/0024300 | A1* | 1/2016 | Li | C08L 51/085 524/405 |
| 2018/0319976 | A1* | 11/2018 | Yamada | C08K 5/29 |

FOREIGN PATENT DOCUMENTS

| | | | |
|---|---|---|---|
| JP | 57-182349 A | | 11/1982 |
| JP | 2003-128736 A | | 5/2003 |
| JP | 2003128736 A | * | 5/2003 |
| JP | 2007-169367 A | | 7/2007 |
| JP | 2007169367 A | * | 7/2007 |
| JP | 2009-155448 A | | 7/2009 |
| WO | 2008/032636 A1 | | 3/2008 |
| WO | WO 2009/081573 A | * | 7/2009 |
| WO | 2009/150831 A1 | | 12/2009 |

OTHER PUBLICATIONS

Extended (supplementary) European Search Report dated Jun. 5, 2018, issued in counterpart European Application No. 15872770.1. (8 pages).

* cited by examiner (a)

(b)

POLYALKYLENE TEREPHTHALATE RESIN COMPOSITION

TECHNICAL FIELD

The present invention relates to a polyalkylene terephthalate resin composition. More specifically, the invention relates to a polyalkylene terephthalate resin composition which exhibits a good balance of excellent heat shock resistance and impact resistance in insert molded articles formed with members of various shapes, and is useful for vehicle components and electrical and electronic components and the like.

BACKGROUND ART

Polyalkylene terephthalate resins such as polybutylene terephthalate resins (hereafter also referred to as "PBT resins") exhibit excellent mechanical properties, electrical properties, and other physical and chemical properties, and also have good processability, and are consequently widely used as engineering plastics in a wide range of applications, including vehicle components and electrical and electronic components. Polyalkylene terephthalate resins can be used particularly favorably in applications such as casing materials for housing substrates with mounted electronic components, and insert molded articles containing an encapsulated sensor probe or connector terminal or the like, for the purpose of protecting the internal components from external moisture and dust, and from damage caused by impacts and the like.

The insert molding method is a molding method in which a member (hereafter also referred to as the "insert member") formed with a metal or an inorganic solid is placed inside the mold in advance and is then encapsulated inside an injection-molded resin, and in order to produce a component that utilizes the rigidity and/or conductivity of the insert member and the moldability of the resin, the insert molding method is widely used as a method that enables simplification of the molding process. However, because the coefficient of expansion and contraction (the so-called linear expansion coefficient) caused by temperature variation is extremely different for the polyalkylene terephthalate resin and the insert member, molded articles in which the resin portion is thin-walled, molded articles having portions with large variations in the wall thickness, and molded articles having a sharp corner or the like often suffer from problems such as cracking immediately following molding or cracking due to temperature changes during use. Further, when the molten resin flows around the insert member inside the mold and converges, a joint portion known as a weld is formed, and cracking that starts from this weld is also common. Accordingly, insert molded articles are currently somewhat limited in terms of potential applications and shapes.

On the other hand, these molded articles also require further improvements in heat shock resistance to withstand use in environments having severe variations in temperature, such as the inside of vehicle engine bays or outdoor environments, and sufficient impact resistance to enable their use as casings. In response to these requirements, for example, JP 2007-169367 A discloses a polybutylene terephthalate resin composition in which a prescribed amount of a thermoplastic elastomer or a core-shell polymer is added to a polybutylene terephthalate resin as an impact resistance improver.

Further, JP 2009-155448 A and WO 2008/032636 each disclose a polybutylene terephthalate resin composition in which prescribed amounts of a core-shell polymer having a specific particle size and having a core layer constituted with an acrylic-based rubber, and glass fibers are added to a polybutylene terephthalate resin.

PRIOR ART DOCUMENTS

Patent Documents

Patent Document 1: JP 2007-169367 A
Patent Document 2: JP 2009-155448 A
Patent Document 3: WO 2008/032636

SUMMARY OF INVENTION

Problems to be Solved by the Invention

In JP 2007-169367 A, a core-shell polymer, and more specifically a core-shell acrylic rubber, is used as an impact resistance improver, and it is described that the average particle size of the rubber layer is not more than 1.0 µm. Investigations by the inventors of the present invention have revealed that this would result in a small average particle size of about 1 µm for the entire core-shell structure including the shell layer, and that although a polyalkylene terephthalate resin composition containing this type of small-particle size core-shell acrylic rubber exhibits excellent impact resistance, the heat shock resistance is inferior. Further, it has been also found that even if the proportion represented by the shell layer is greatly increased, so that the average particle size of the overall core-shell structure is increased, a polyalkylene terephthalate resin composition containing such a core-shell acrylic rubber in which the proportion represented by the core layer is small also exhibits inferior heat shock resistance.

In JP 2009-155448 A and WO 2008/032636, a core-shell polymer having an average particle size of at least 2 µm is used. However, investigations by the inventors of the present invention have revealed that even with this type of core-shell polymer, a satisfactory improvement in the heat shock resistance cannot be obtained in some cases if the structures of the core layer and the shell layer are not selected appropriately. It has also found that, particularly in those cases where a member with a plate-like shape is used as the insert member, the heat shock resistance may be insufficient, even when a composition is used that was deemed advantageous for the types of block-shaped insert members used in the examples of JP 2009-155448 A.

Embodiments of the present invention have been developed to address the problems outlined above, and have an object of providing technology for obtaining a polyalkylene terephthalate resin composition which exhibits a good balance of excellent heat shock resistance and impact resistance in insert molded articles having insert members of various shapes.

Means to Solve the Problems

The inventors of the present invention undertook intensive research with the aim of achieving the above object. As a result, they have discovered that when a polyalkylene terephthalate resin composition containing an acrylic-based core-shell polymer which has an average particle size of 2 µm or greater and in which the amount of the core layer component is more than 80% by mass but less than 100% by mass relative to the total mass of the core layer and shell layer components was used, a good balance of excellent heat shock resistance and impact resistance could be achieved, enabling them to complete the present invention. More specifically, embodiments of the present invention relate to the polyalkylene terephthalate resin composition and the molded article described below.

(1) A polyalkylene terephthalate resin composition comprising: (A) a polyalkylene terephthalate resin, and (B) an acrylic-based core-shell polymer which has an average particle size of 2 μm or greater and in which an amount of a core layer component is more than 80% by mass but less than 100% by mass relative to a total mass of the core layer component and a shell layer component.

(2) The polyalkylene terephthalate resin composition according to (1), wherein the average particle size of the component (B) is at least 2.5 μm but not more than 20 μm, and the amount of the core layer component is at least 85% by mass but not more than 95% by mass relative to the total mass of the core layer component and the shell layer component.

(3) The polyalkylene terephthalate resin composition according to (1), wherein the average particle size of the component (B) is at least 3 μm but not more than 10 μm, and the amount of the core layer component is at least 90% by mass but not more than 92% by mass relative to the total mass of the core layer component and the shell layer component.

(4) The polyalkylene terephthalate resin composition according to (1), wherein the average particle size of the component (B) is about 3 μm, and the amount of the core layer component is about 90% by mass relative to the total mass of the core layer component and the shell layer component.

(5) The polyalkylene terephthalate resin composition according to any one of (1) to (4), wherein an amount of the component (B) is at least 10 parts by mass but not more than 50 parts by mass per 100 parts by mass of the component (A).

(6) The polyalkylene terephthalate resin composition according to any one of (1) to (5), further comprising: (C) a filler in an amount of at least 10 parts by mass but not more than 100 parts by mass per 100 parts by mass of the component (A).

(7) The polyalkylene terephthalate resin composition according to any one of (1) to (6), wherein when the following insert molded article A is produced, the insert molded article A satisfies the following heat shock resistance condition A.

(Insert Molded Article A)
An insert molded article into which an L-shaped iron plate with 21 mm in a width×90 mm×90 mm and a thickness of 1.6 mm is inserted, and in which the resin portion is an L-shaped plate with 25 mm in a width×70 mm×70 mm and a thickness of 3.6 mm, in which the minimum wall thickness in part of the resin portion is 1 mm.

(Heat Shock Resistance Condition A)
In a heat shock resistance test using a thermal shock tester in which a process of performing heating at 140° C. for 1 hour and 30 minutes, subsequently lowering a temperature to −40° C. and performing cooling for 1 hour and 30 minutes, and then raising a temperature back to 140° C. is deemed one cycle, a number of cycles performed before cracking appears in the molded article is at least 100.

(8) The polyalkylene terephthalate resin composition according to any one of (1) to (6), wherein when the following insert molded article B is produced, the insert molded article B satisfies the following heat shock resistance condition B.

(Insert Molded Article B)
An insert molded article into which an I-shaped iron plate with 20 mm in a width×150 mm and a thickness of 1.6 mm is inserted, and in which a resin portion is an I-shaped plate with 25 mm in a width×120 mm and a thickness of 4 mm, in which a minimum wall thickness in part of the resin portion is 1 mm.

(Heat Shock Resistance Condition B)
In a heat shock resistance test using a thermal shock tester in which a process of performing heating at 140° C. for 1 hour and 30 minutes, subsequently lowering a temperature to −40° C. and performing cooling for 1 hour and 30 minutes, and then raising a temperature back to 140° C. is deemed one cycle, a number of cycles performed before cracking appears in the molded article is at least 40.

(9) A molded article obtained by molding the polyalkylene terephthalate resin composition according to any one of (1) to (8).

(10) The molded article according to (9), wherein the article is an insert molded article obtained by performing insert molding using the polyalkylene terephthalate resin composition and an insert member comprising a metal or an inorganic solid.

(11) The molded article according to (10), wherein the insert member is a plate-like electrical connection conductor.

(12) The molded article according to (11), wherein the insert member that is the plate-like electrical connection conductor has a ratio of 2 or greater for a maximum width relative to a maximum thickness in a cross-section perpendicular to a lengthwise direction of a planar surface of the plate-like conductor.

Effects of the Invention

According to embodiments of the present invention, a polyalkylene terephthalate resin composition can be obtained which exhibits a good balance of excellent heat shock resistance and impact resistance in insert molded articles having insert members of various shapes.

EMBODIMENTS FOR CARRYING OUT THE INVENTION

Figure 1:
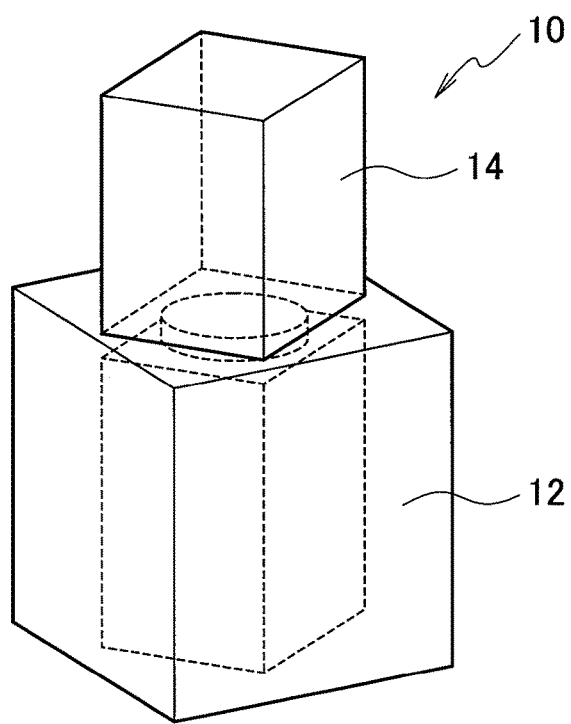
FIG. 1 is a (partially see-through) perspective view illustrating an insert molded article using a prism-shaped insert member that is produced in a heat shock resistance evaluation in the examples.

Embodiments of the present invention are described below in detail, but the present invention is in no way limited by the following examples.

<Polyalkylene Terephthalate Resin Composition>

The polyalkylene terephthalate resin composition of an embodiment of the present invention comprises: (A) a polyalkylene terephthalate resin, and (B) an acrylic-based core-shell polymer which has an average particle size of 2 μm or greater and in which the amount of the core layer component is more than 80% by mass but less than 100% by mass relative to the total mass of the core layer and shell layer components. Each of the components contained in the polyalkylene terephthalate resin composition is described below.

[(A) Polyalkylene Terephthalate Resin]

The polyalkylene terephthalate resin (A) that functions as the base resin of the polyalkylene terephthalate resin composition according to an embodiment of the present invention is a thermoplastic polyester resin obtained by reacting a dicarboxylic acid component containing a dicarboxylic acid compound and/or an ester-forming derivative thereof as the main component, and a diol component containing a diol compound and/or an ester-forming derivative thereof as the main component, wherein terephthalic acid and/or an ester-forming derivative thereof is used as the main component of the dicarboxylic acid component, and an alkylene glycol and/or an ester-forming derivative thereof is used as the main component of the diol component.

Copolyesters which also contain a dicarboxylic acid component or a diol component other than the main components, and/or other copolymerizable monomers such as an oxycarboxylic acid component and a lactone component (hereafter sometimes referred to as copolymerizable monomers) can also be used as the polyalkylene terephthalate resin.

Examples of dicarboxylic acid components other than the main component include aliphatic dicarboxylic acids (for example, dicarboxylic acids of about $C_4$ to $C_{40}$, and preferably about $C_4$ to $C_{14}$, such as succinic acid, glutaric acid, adipic acid, pimelic acid, suberic acid, azelaic acid, sebacic acid, undecanedicarboxylic acid, dodecanedicarboxylic acid, hexadecanedicarboxylic acid and dimer acids), alicyclic dicarboxylic acids (for example, dicarboxylic acids of about $C_4$ to $C_{40}$, and preferably about $C_8$ to $C_{12}$, such as hexahydrophthalic acid, hexahydroisophthalic acid, hexahydroterephthalic acid and himic acid), aromatic dicarboxylic acids other than terephthalic acid (for example, dicarboxylic acids of about $C_8$ to $C_{16}$ such as phthalic acid, isophthalic acid, methylisophthalic acid, methylterephthalic acid, naphthalenedicarboxylic acids such as 2,6-naphthalenedicarboxylic acid, 4,4'-biphenyldicarboxylic acid, 4,4'-diphenoxy ether dicarboxylic acid, 4,4'-dioxybenzoic acid, 4,4'-diphenylmethanedicarboxylic acid and 4,4'-diphenyl ketone dicarboxylic acid), and derivatives of these compounds (for example, lower alkyl esters, aryl esters, and ester-forming derivatives such as acid anhydrides). Examples of dicarboxylic acid components that can be combined favorably with the terephthalic acid include isophthalic acid and naphthalenedicarboxylic acids, and combinations of two or more of these compounds may also be used. However, it is preferable that at least 50 mol %, more preferably at least 80 mol %, and even more preferably at least 90 mol % of all of the dicarboxylic acid components included as copolymerizable monomers are aromatic dicarboxylic acid compounds. If necessary, polyvalent carboxylic acids such as trimellitic acid and pyromellitic acid, or ester-forming derivatives thereof (such as alcohol esters), may also be used. By also including this type of polyvalent compound, a branched polyalkylene terephthalate resin can be obtained.

Examples of diol components other than the main component include aliphatic alkanediols (for example, aliphatic alkanediols of about $C_2$ to about $C_{12}$, and preferably about $C_2$ to about $C_{10}$, that are not used as the main component, such as ethylene glycol, trimethylene glycol, propylene glycol, 1,4-butanediol, 1,3-butanediol, neopentyl glycol, hexanediol, octanediol and decanediol), polyoxyalkylene glycols (glycols having a plurality of oxyalkylene units of about $C_2$ to about $C_4$, such as diethylene glycol, dipropylene glycol, ditetramethylene glycol, triethylene glycol, tripropylene glycol and polytetramethylene glycol, and the like), and alicyclic diols (for example, 1,4-cyclohexanediol, 1,4-cyclohexanedimethanol and hydrogenated bisphenol A). Aromatic diols such as hydroquinone, resorcinol, bisphenol, 2,2-bis(4-hydroxyphenyl)propane, 2,2-bis(4-(2-hydroxyethoxy)phenyl)propane and xylylene glycol may also be used. However, it is preferable that at least 50 mol %, more preferably at least 80 mol %, and even more preferably at least 90 mol % of all of the diol components included as copolymerizable monomers are alkylene glycols. If necessary, polyols such as glycerol, trimethylolpropane, trimethylolethane and pentaerythritol, or ester-forming derivatives thereof, may also be used. By also including this type of polyfunctional compound, a branched thermoplastic polyester resin can be obtained.

Examples of oxycarboxylic acids (or oxycarboxylic acid components or oxycarboxylic acids) include oxycarboxylic acids such as oxybenzoic acid, oxynaphthoic acid, hydroxyphenylacetic acid, glycolic acid and oxycaproic acid, and derivatives thereof. Examples of lactones include $C_3$ to $C_{12}$ lactones such as propiolactone, butyrolactone, valerolactone and caprolactones (such as s-caprolactone).

In the case of a copolyester, the proportion of the copolymerizable monomers may be selected from within a range from at least about 0.01 mol % to not more than about 30 mol %, and is typically at least about 1 mol % but not more than about 25 mol %, preferably at least about 3 mol % but not more than about 20 mol %, and even more preferably at least about 5 mol % but not more than about 15 mol %. Further, in those cases where a combination of a homopolyester and a copolyester is used, the proportions of the homopolyester and the copolyester can be selected so that the proportion of the copolymerizable monomers, relative to all of the monomers, is at least about 0.01 mol % but not more than about 30 mol % (preferably at least about 1 mol % but not more than about 25 mol %, more preferably at least about 3 mol % but not more than about 20 mol %, and even more preferably at least about 5 mol % but not more than about 15 mol %), and the ratio of former/latter is within a range from 99/1 to 1/99 (mass ratio), preferably from 95/5 to 5/95 (mass ratio), and even more preferably from about 90/10 to 10/90 (mass ratio).

Examples of preferred polyalkylene terephthalate resins include homopolyesters and copolyesters containing an alkylene terephthalate unit as the main component (for example, about 50 to about 100 mol %, and preferably about 75 to about 100 mol %) [examples include homopolyesters, including poly($C_2$ to $C_4$ alkylene terephthalates) such as polyethylene terephthalate (PET), polytrimethylene terephthalate (PTT) and polybutylene terephthalate (PBT), copolyesters containing an alkylene terephthalate unit as the main component and an alkylene isophthalate unit as a copolymerization component, and copolyesters containing an alkylene terephthalate unit as the main component and an alkylene naphthalate unit as a copolymerization component], and these resins may be used individually, or in combinations containing two or more resins.

Examples of particularly preferred polyalkylene terephthalate resins include homopolyester resins or copolyester resins containing at least 80 mol % (and preferably 90 mol % or more) of $C_2$ to $C_4$ alkylene terephthalate units such as ethylene terephthalate, trimethylene terephthalate and tetramethylene terephthalate (for example, polyethylene terephthalate resins, polytrimethylene terephthalate resins, polybutylene terephthalate resins, isophthalic acid-modified polyethylene terephthalate resins, isophthalic acid-modified polytrimethylene terephthalate resins, isophthalic acid-modified polybutylene terephthalate resins, naphthalenedicarboxylic acid-modified polyethylene terephthalate resins, naphthalenedicarboxylic acid-modified polytrimethylene terephthalate resins, and naphthalenedicarboxylic acid-modified polybutylene terephthalate resins and the like).

Of these, polyethylene terephthalate resins and polybutylene terephthalate resins are preferred, and polybutylene terephthalate resins are particularly desirable.

There are no particular limitations on the amount of terminal carboxyl groups in the polyalkylene terephthalate resin, provided the effects of the present invention are not impaired. The amount of terminal carboxyl groups in the polyalkylene terephthalate resin is preferably not more than 30 meq/kg, and is more preferably 25 meq/kg or less. If the amount of terminal carboxyl groups in the polyalkylene terephthalate resin is too high, then there is a possibility that the hydrolysis resistance may be impaired.

There are no particular limitations on the intrinsic viscosity (IV) of the polyalkylene terephthalate resin, provided effects of the present invention are not impaired. The intrinsic viscosity of the polyalkylene terephthalate resin is preferably from 0.6 to 1.3 dL/g, and more preferably from 0.7 to 1.2 dL/g. When a polyalkylene terephthalate resin having an intrinsic viscosity within this range is used, the resulting polyalkylene terephthalate resin composition exhibits particularly superior moldability. The intrinsic viscosity can be adjusted by blending polyalkylene terephthalate resins having different intrinsic viscosities. For example, a polyalkylene terephthalate resin having an intrinsic viscosity of 1.0 dL/g and a polyalkylene terephthalate resin having an intrinsic viscosity of 0.8 dL/g can be blended together to prepare a polyalkylene terephthalate resin having an intrinsic viscosity of 0.9 dL/g. The intrinsic viscosity (IV) of the polyalkylene terephthalate resin can be measured, for example, in o-chlorophenol at a temperature of 35° C.

Commercially available resins may be used as the polyalkylene terephthalate resin, or a resin produced by copolymerizing (by polycondensation) a dicarboxylic acid component or a reactive derivative thereof, a diol component or a reactive derivative thereof, and where necessary any other copolymerizable monomers, using a typical method such as a transesterification or direct esterification method may be used.

[(B) Acrylic-Based Core-Shell Polymer]

A core-shell polymer is a polymer having a multilayered structure containing a core layer (core portion) and a shell layer that covers a part or all of this core layer (core layer surface). In the core-shell polymer, it is preferable that one of the core layer and the shell layer is formed from a rubber component (soft component), and the other is formed from a hard component.

The core layer is typically formed from a rubber component, and in an embodiment of the present invention, the use of an acrylic-based rubber is preferred. The glass transition temperature of the rubber component is, for example, preferably less than 0° C. (for example, −10° C. or lower), more preferably −20° C. or lower (for example, about −180 to −25° C.), and even more preferably −30° C. or lower (for example, about −150 to −40° C.).

Examples of acrylic-based rubbers that can be used as the rubber component include polymers containing an acrylic-based monomer as the main component [and in particular, an acrylate ester such as an alkyl acrylate (typically a $C_1$ to $C_{12}$ alkyl acrylate, preferably a $C_1$ to $C_8$ alkyl acrylate, and more preferably a $C_2$ to $C_6$ alkyl acrylate, such as butyl acrylate)]. The acrylic-based rubber may be a homopolymer of the acrylic-based monomer or a copolymer (such as a copolymer of different acrylic-based monomers, or a copolymer of the acrylic-based monomer and another monomer having an unsaturated bond), or may be a copolymer of an acrylic-based monomer (and another monomer having an unsaturated bond) and a crosslinkable monomer.

Examples of the crosslinkable monomer include (meth)acrylic acid-based monomers {such as polyfunctional (meth)acrylates [for example, alkylene (meth)acrylates such as butylene di(meth)acrylate, and (poly)hydroxyalkane poly (meth)acrylates such as ethylene glycol di(meth)acrylate, butylene glycol di(meth)acrylate, poly- (or oligo-) ethylene glycol di(meth)acrylate (such as diethylene glycol di(meth)acrylate and triethylene glycol di(meth)acrylate), glycerol tri(meth)acrylate, trimethylolethane tri(meth)acrylate, trimethylolpropane di(meth)acrylate, trimethylolpropane tri(meth)acrylate, pentaerythritol di(meth)acrylate, pentaerythritol tetra(meth)acrylate, dipentaerythritol tetra(meth)acrylate, and dipentaerythritol hexa(meth)acrylate], vinyl-based monomers (such as vinyl (meth)acrylate and divinylbenzene), and glycidyl (meth)acrylate}, hydrolytically condensable compounds having a polymerizable unsaturated bond [for example, silane coupling agents having a (meth)acryloyl group (including (meth)acryloyloxy-alkyltrialkoxysilanes such as 3-trimethoxypropyl (meth) acrylate)], and allyl-based compounds (for example, allyl (meth)acrylate, diallyl maleate, diallyl fumarate, diallyl itaconate, monoallyl maleate, monoallyl fumarate and triallyl (iso)cyanurate). These crosslinkable monomers may be used individually, or in combinations containing two or more monomers.

In the acrylic-based rubber, the proportion of acrylate esters (and particularly alkyl acrylates) is preferably from 50 to 100% by mass, more preferably from 70 to 99% by mass, and even more preferably from about 80 to 98% by mass, relative to the total mass of the acrylic-based rubber. Further, in the acrylic-based rubber, the amount of crosslinkable monomers, per 100 parts by mass of the acrylate esters, is preferably from 0.1 to 10 parts by mass, more preferably from 0.2 to 5 parts by mass, and even more preferably from about 0.3 to 5 parts by mass.

Even in those cases where the core layer contains an acrylic-based rubber as the main component, a non-rubber component (for example, a hard resin component described below) may also be included.

The structure of the core layer may be either a uniform structure or a non-uniform structure (such as a salami-type structure).

In the core-shell polymer, the shell layer is typically formed of a hard resin component (or a glass-like resin component). The glass transition temperature of the hard resin component can typically be selected from within the range of 0° C. or higher (for example, 20° C. or higher), and is typically 30° C. or higher (for example, about 30 to 300°

C.), preferably 50° C. or higher (for example, about 60 to 250° C.), and more preferably 70° C. or higher (for example, about 80 to 200° C.).

This type of hard resin component is typically formed of a vinyl-based polymer (a polymer of a vinyl-based monomer). In the vinyl-based polymer (resin), there are no particular limitations on the vinyl-based monomer, provided the vinyl-based polymer can be prepared with the range of glass transition temperature described above, and examples include methacrylic-based monomers [for example, methacrylate esters including alkyl methacrylates (such as $C_1$ to $C_{20}$ alkyl methacrylates, preferably $C_1$ to $C_{10}$ alkyl methacrylates, and more preferably $C_1$ to $C_6$ alkyl methacrylates, such as methyl methacrylate, ethyl methacrylate, propyl methacrylate, butyl methacrylate, hexyl methacrylate and 2-ethylhexyl methacrylate), aryl methacrylates (such as phenyl methacrylate) and cycloalkyl methacrylates (such as cyclohexyl methacrylate)], as well as the monomers mentioned above [for example, acrylic-based monomers, aromatic vinyl-based monomers (such as styrene), olefin-based monomers, and cyanated vinyl-based monomers (such as (meth)acrylonitrile)]. These vinyl-based monomers may be used individually, or in combinations containing two or more monomers. The vinyl-based monomer is often a polymer in which at least one monomer selected from among methacrylic-based monomers, aromatic vinyl-based monomers and cyanated vinyl-based monomers [and in particular, at least a methacrylate ester (such as an alkyl methacrylate such as methyl methacrylate)] is used as a polymerization component.

The shell layer may be formed of either a single layer or a plurality of layers, provided it covers a part or all of the core layer.

In the core-shell polymer, the proportion of the core layer component relative to the total mass of the core layer and the shell layer is preferably greater than 80% by mass but less than 100% by mass, more preferably at least 85% by mass but not more than 95% by mass (for example, about 90% by mass), and even more preferably at least 90% by mass but not more than 92% by mass. When the core layer proportion exceeds 80% by mass, a satisfactory improvement in the heat shock resistance can be more easily obtained. A core layer proportion of not more than 95% by mass is advantageous in terms of reducing the degree of difficulty associated with producing the core-shell polymer, and is therefore preferred in terms of availability and quality stability. The proportion of each component of the core layer and the shell layer can be confirmed by analysis of the $^1$H NMR chart, by calculating the integrated value of the peak attributable to that structural component, but because the proportion is also substantially equal to the blend ratio of the corresponding monomer used in producing the core-shell polymer, the proportion can also be calculated based on this blend ratio.

In an embodiment of the present invention, those cases where the core-shell polymer (B) is a polymer in which the shell layer component has a reactive functional group are preferred, because the impact resistance and the heat shock resistance of the resin composition are excellent, and the hydrolysis resistance is also particularly superior.

Examples of the aforementioned reactive functional group include an epoxy group, a hydroxy group, a carboxy group, an alkoxy group, an isocyanate group, an acid anhydride group and an acid chloride group, and of these, an epoxy group is preferred. The amount of the reactive functional groups is preferably at least 1 mmol but not more than 40 mmol, more preferably at least 2 mmol but not more than 20 mmol, and even more preferably at least 3 mmol but not more than 15 mmol, per 100 g of the core-shell polymer. Including at least 1 mmol of the functional groups tends to result in even more superior heat shock resistance. On the other hand, when the amount is not more than 40 mmol, the fluidity of the resin composition tends to be less likely to deteriorate, which is preferable.

In an embodiment of the present invention, the amount of the core-shell polymer (B) is preferably at least 5 parts by mass but not more than 50 parts by mass, and more preferably at least 10 parts by mass but not more than 30 parts by mass, per 100 parts by mass of the polyalkylene terephthalate resin (A). By using an amount within this range, the heat shock resistance of the obtained polyalkylene terephthalate resin composition can be improved without significantly impairing the hydrolysis resistance and the fluidity.

In an embodiment of the present invention, the average particle size of the core-shell polymer (B) is preferably at least 2 μm, more preferably at least 2.5 μm but not more than 20 μm (for example, about 3 μm), and even more preferably at least 3 μm but not more than 10 μm. When the average particle size is at least 2 μm, a satisfactory improvement in the heat shock resistance can be more easily obtained, and the heat shock resistance and the impact resistance can be improved with good balance. When the average particle size is not more than 20 μm, production of that type of core-shell polymer is comparatively simple, which is preferable from a cost perspective. Further, when the average particle size is not more than 20 μm, the hydrolysis resistance of the obtained polyalkylene terephthalate resin composition is also excellent, which is particularly desirable. In the present invention, the "average particle size" refers to the volume average particle size (μm) obtained by measuring the core-shell polymer in a latex state using a MICROTRAC UPA150 device manufactured by Nikkiso Co., Ltd.

In this type of core-shell polymer, and particularly in those cases where the shell layer is formed of a hard component, the particle size is stabilized by the hard component of the shell, and therefore in terms of suppressing variation in the dispersed state (the average particle size) in the polyalkylene terephthalate resin composition caused by the melt-kneading conditions used during extrusion or molding, a core-shell polymer is advantageous compared to other elastomers.

[(C) Filler]

The polyalkylene terephthalate resin composition of an embodiment of the present invention may also contain a filler (C). By including the filler (C), the mechanical properties can be improved. Further, by reducing the mold shrinkage factor and the linear expansion coefficient for the polyalkylene terephthalate resin composition, further improvement in the heat shock resistance can also be expected.

Examples of the filler of the component (C) include fibrous fillers [for example, inorganic fibers such as glass fiber, asbestos fiber, carbon fiber, silica fiber, alumina fiber, silica-alumina fiber, zirconia fiber, boron nitride fiber, silicon nitride fiber, boron fiber, potassium titanate fiber, silicon carbide fiber and whiskers (such as whiskers of silicon carbide, alumina and silicon nitride), and organic fibers formed from, for example, polyamide or fluororesin, and the like], plate-like fillers [for example, talc, mica, glass flakes and graphite] and powdered fillers [for example, glass beads, glass powder, milled fibers (such as milled glass fiber) and wollastonite], and of these fillers, glass-based fillers (such as glass fiber, glass flakes and glass beads), talc, mica, and wollastonite and the like are preferred, and among these, glass fiber is particularly favorable in terms of ease of availability, strength and rigidity. Further, plate-like and powdered fillers can be used particularly favorably in terms of suppressing anisotropy of the mold shrinkage factor and linear expansion coefficient of the polyalkylene terephthalate resin composition. When using these fillers, conventional surface treatment agents may also be used as required.

When a fibrous filler is used as the component (C), there are no particular limitations on the shape of the fibers. For example, the fiber length is preferably from 100 μm to 5 mm, and more preferably about 500 μm to about 3 mm, and the fiber diameter is preferably from 1 to 50 μm, and more preferably about 3 to about 30 μm. Similarly, when a plate-like filler or powdered filler is used, there are no particular limitations on the average particle size of the filler, but for example, the average particle size is preferably from 0.1 to 100 μm, and more preferably about 0.1 to about 50 μm. These fillers (C) may be used individually, or in combinations containing two or more fillers.

The amount added of the filler of the component (C) is preferably at least 10 parts by mass but not more than 100 parts by mass, more preferably at least 20 parts by mass but not more than 90 parts by mass, and even more preferably at least about 30 parts by mass but not more than about 80 parts by mass (for example, 40 to 70 parts by mass), per 100 parts by mass of the polyalkylene terephthalate resin (A). By using an amount within this range, the mechanical properties can be improved without significantly impairing the fluidity of the resin composition.

[Other Components]

The polyalkylene terephthalate resin composition of an embodiment of the present invention may also include any conventional substance typically added to thermoplastic resins and thermosetting resins for the purpose of imparting specific desired properties, provided these substances do not impair the effects of the present invention, and specific examples of substances that may be added include stabilizers such as antioxidants and ultraviolet absorbers, hydrolysis resistance improvers (such as epoxy resins), antistatic agents, flame retardants, flame retardant assistants, antidripping agents, colorants such as dyes and pigments, mold release agents, lubricants, crystallization promoters and crystal nucleating agents.

[Preparation Method]

The polyalkylene terephthalate resin composition of an embodiment of the present invention can be prepared easily by using the facilities and methods typically used for preparing conventional resin compositions. Examples of methods that may be used include a method in which the components are mixed, a single-screw or twin-screw extruder is used to knead and extrude the mixture to prepare pellets, and the pellets are then molded, a method in which pellets having different compositions are first prepared, and prescribed amounts of those pellets are then mixed and subjected to molding to obtain a molded article of the targeted composition, and a method in which one or more of each of the components are supplied directly to a molding device.

<Molded Article>

A molded article of an embodiment of the present invention is an article obtained by molding the polyalkylene terephthalate resin composition of the present invention. There are no particular limitations on the molding method, and conventional molding methods may be employed. The molded article according to an embodiment of the present invention is preferably an insert molded article obtained by performing insert molding using the polyalkylene terephthalate resin composition of the present invention and an insert member formed of a metal or an inorganic solid. There are no particular limitations on the metal or inorganic solid. Examples of the metal include aluminum, magnesium, stainless steel and copper, and also include metal conductive portions such as electronic circuits formed on resin substrates. Examples of the inorganic solid include ceramics and the like. The insert molding may be conducted using conventional methods.

As mentioned above, conventionally, when a plate-like electrical connection conductor is used as the insert member, the heat shock resistance may sometimes be unsatisfactory, but even in these cases, excellent heat shock resistance can be obtained in the molded article of an embodiment of the present invention. Specific examples of these types of plate-like electrical connection conductors include members having a ratio of 2 or greater for the maximum width relative to the maximum thickness in a cross-section perpendicular to the lengthwise direction of the planar surface of the plate-like member (for example, wiring materials such as bus bars).

The plate-like electrical connection conductor according to an embodiment of the present invention preferably has an average thickness of not more than 3 mm, and more preferably has an average thickness of 2 mm or less. There are no particular limitations on the lower limit for the thickness of the plate-like electrical connection conductor, but 0.1 mm is typical.

Further, in the molded article of an embodiment of the present invention (an insert molded article), although there are no particular limitations on the thickness of the resin portion covering the plate-like electrical connection conductor, the average thickness is typically not more than 3 mm, and is preferably 2 mm or less. There are no particular limitations on the lower limit for the thickness of the resin member, but 0.1 mm is typical. Here, the thickness of the resin portion covering the plate-like electrical connection conductor indicates the length in a perpendicular direction from the surface of the insert molded article to the surface of the electrical connection conductor directly underneath. Furthermore, a plurality of electrical connection conductors are sometimes inserted in a single inserted molded article, with a layer of the resin portion sandwiched between the conductors, and in such cases, potential thickness values for the resin portion include the thickness from the surface of the insert molded article to the (outermost layer of the) electrical connection conductor directly underneath, and the thickness of the resin portion sandwiched between the electrical connection conductors, but even in the case where one of these resin portion thickness values falls within the range for the thickness of the resin portion described above, it is desirable that the heat shock resistance in that part of the resin portion is considered.

Considering that when the ratio between the thickness of the resin portion and the thickness of the electrical connection conductor is such that the ratio of the resin portion is extremely high (meaning the electrical connection conductor is too thin), there is a possibility that the electrical connection conductor may deform as a result of shrinkage of the resin portion, whereas when the ratio of the resin portion is extremely low (meaning the resin portion is too thin), there is a possibility that the fluidity of the resin may be unsatisfactory, resulting in molding defects, the ratio of resin portion:electrical connection conductor is preferably within a range from 1:8 to 8:1, and is more preferably from 1:5 to 5:1.

When an insert molded article is produced using the polyalkylene terephthalate resin composition of an embodiment of the present invention and an L-shaped or I-shaped insert member, specific shapes for the insert member and examples of the heat shock resistance conditions corresponding with those shapes are described below.

(1) L-Shaped Insert Member

When an insert molded article A described below is produced, the heat shock resistance condition A described below is satisfied.

(Insert Molded Article A)

An insert molded article into which an L-shaped iron plate having 21 mm in a width×90 mm×90 mm and a thickness of 1.6 mm is inserted, and in which the resin portion is an L-shaped plate with 25 mm in a width×70 mm×70 mm and a thickness of 3.6 mm, in which the minimum wall thickness in part of the resin portion is 1 mm.

(Heat Shock Resistance Condition A)

In a heat shock resistance test using a thermal shock tester in which the process of performing heating at 140° C. for 1 hour and 30 minutes, subsequently lowering the temperature to −40° C. and performing cooling for 1 hour and 30 minutes, and then raising the temperature back to 140° C. is deemed one cycle, the number of cycles performed before cracking appears in the molded article is at least 100 (preferably at least 120, and even more preferably 150 or greater).

(2) I-Shaped Insert Member

When an insert molded article B described below is produced, the heat shock resistance condition B described below is satisfied.

(Insert Molded Article B)

An insert molded article into which an I-shaped iron plate with 20 mm in a width×150 mm and a thickness of 1.6 mm is inserted, and in which the resin portion is an I-shaped plate with 25 mm in a width×120 mm and a thickness of 4 mm, in which the minimum wall thickness in part of the resin portion is 1 mm.

(Heat Shock Resistance Condition B)

In a heat shock resistance test using a thermal shock tester in which the process of performing heating at 140° C. for 1 hour and 30 minutes, subsequently lowering the temperature to −40° C. and performing cooling for 1 hour and 30 minutes, and then raising the temperature back to 140° C. is deemed one cycle, the number of cycles performed before cracking appears in the molded article is at least 40 (preferably at least 50, and even more preferably 60 or greater).

EXAMPLES

The present invention is described below in further detail using a series of examples, but the present invention is in no way limited by the following examples.

<Materials>

(A) Polyalkylene terephthalate resin

A PBT resin manufactured by WinTech Polymer Ltd., intrinsic viscosity: 0.69 dl/g, amount of terminal carboxyl groups: 24 meq/kg (B) Acrylic-based core-shell polymer B-1: an acrylic-based core-shell polymer using a butyl acrylate polymer (acrylic-based rubber) for the core layer and a methyl methacrylate polymer (vinyl-based copolymer) for the shell layer, and having a core layer ratio of 90% by mass and an average particle size of 3 μm B-2: an acrylic-based core-shell polymer using a butyl acrylate polymer (acrylic-based rubber) for the core layer and a methyl methacrylate polymer (vinyl-based copolymer) for the shell layer, and having a core layer ratio of 90% by mass and an average particle size of 20 μm B-3: an acrylic-based core-shell polymer using a butyl acrylate polymer (acrylic-based rubber) for the core layer and a methyl methacrylate polymer (vinyl-based copolymer) for the shell layer, and having a core layer ratio of 90% by mass and an average particle size of 30 μm B-4: an acrylic-based core-shell polymer using a butyl acrylate polymer (acrylic-based rubber) for the core layer and a methyl methacrylate polymer (vinyl-based copolymer) for the shell layer, and having a core layer ratio of 80% by mass and an average particle size of 0.1 μm B-5: an acrylic-based core-shell polymer using a butyl acrylate polymer (acrylic-based rubber) for the core layer and a methyl methacrylate polymer (vinyl-based copolymer) for the shell layer, and having a core layer ratio of 80% by mass and an average particle size of 0.2 μm B-6: an acrylic-based core-shell polymer using a butyl acrylate polymer (acrylic-based rubber) for the core layer and a methyl methacrylate polymer (vinyl-based copolymer) for the shell layer, and having a core layer ratio of 80% by mass and an average particle size of 0.5 μm B-7: an acrylic-based core-shell polymer using a butyl acrylate polymer (acrylic-based rubber) for the core layer and a methyl methacrylate polymer (vinyl-based copolymer) for the shell layer, and having a core layer ratio of 80% by mass and an average particle size of 1.4 μm B-8: an acrylic-based core-shell polymer using a butyl acrylate polymer (acrylic-based rubber) for the core layer and a methyl methacrylate polymer (vinyl-based copolymer) for the shell layer, and having a core layer ratio of 80% by mass and an average particle size of 3.3 μm B-9: an acrylic-based core-shell polymer using a butyl acrylate polymer (acrylic-based rubber) for the core layer and a methyl methacrylate polymer (vinyl-based copolymer) for the shell layer, and having a core layer ratio of 80% by mass and an average particle size of 10.5 μm B-10: an acrylic-based core-shell polymer using a butyl acrylate polymer (acrylic-based rubber) for the core layer and a methyl methacrylate/glycidyl methacrylate copolymer (vinyl-based copolymer) for the shell layer, and having a core layer ratio of 90% by mass, a ratio between the methyl methacrylate and the glycidyl methacrylate of 9% by mass: 1% by mass and an average particle size of 3 μm (C) Glass fiber Product name: T-187, manufactured by Nippon Electric Glass Co., Ltd.

Antioxidant

Product name: Irganox 1010, manufactured by BASF Japan Ltd.

Hydrolysis resistance improver

Product name: Epikote JER1005K, an epoxy resin manufactured by Mitsubishi Chemical Corporation.

Examples 1 to 4, Comparative Examples 1 to 6

With respect to 100 parts by mass of the polyalkylene terephthalate resin (A), the components in the proportions shown in Table 1 were mixed, and the resulting mixture was subjected to melt kneading and extrusion using a twin-screw extruder having screws of 30 mmϕ (TEX-30 manufactured by The Japan Steel Works, Ltd.) under conditions including a cylinder temperature of 260° C., a discharge rate of 15 kg/h and a screw rotational rate of 150 rpm, thus obtaining pellets formed of the polyalkylene terephthalate resin composition. Subsequently, various test pieces were produced from these pellets by injection molding, and the physical property evaluations described below were performed. The results of the evaluations are also shown in Table 1.

[Melt Viscosity]

Following drying of the pellets described above at 140° C. for 3 hours, the melt viscosity was measured in accordance with ISO 11443, using a Capillograph 1B (manufactured by Toyo Seiki Seisaku-Sho, Ltd.) under conditions including a furnace temperature of 260° C., a capillary of ϕ1 mm×20 mmL and a shear rate of 1,000 sec$^{-1}$.

[Tensile Strength and Tensile Breaking Strain]

Following drying of the pellets described above at 140° C. for 3 hours, ISO 3167 tensile test pieces were prepared by injection molding under conditions including a resin temperature of 260° C., a mold temperature of 80° C., an injection time of 15 seconds and a cooling time of 15 seconds, and the tensile strength and tensile breaking strain were then measured in accordance with ISO 527-1, 2.

[Impact Resistance (Charpy Impact Strength)]

The pellets described above were injection molded using a molding temperature of 260° C. and a mold temperature of 80° C. to prepare a Charpy impact test piece, and the Charpy impact strength at 23° C. was measured in accordance with ISO 179/1eA.

[Heat Shock Resistance (Prism-Shaped Member)]

Figure 2:
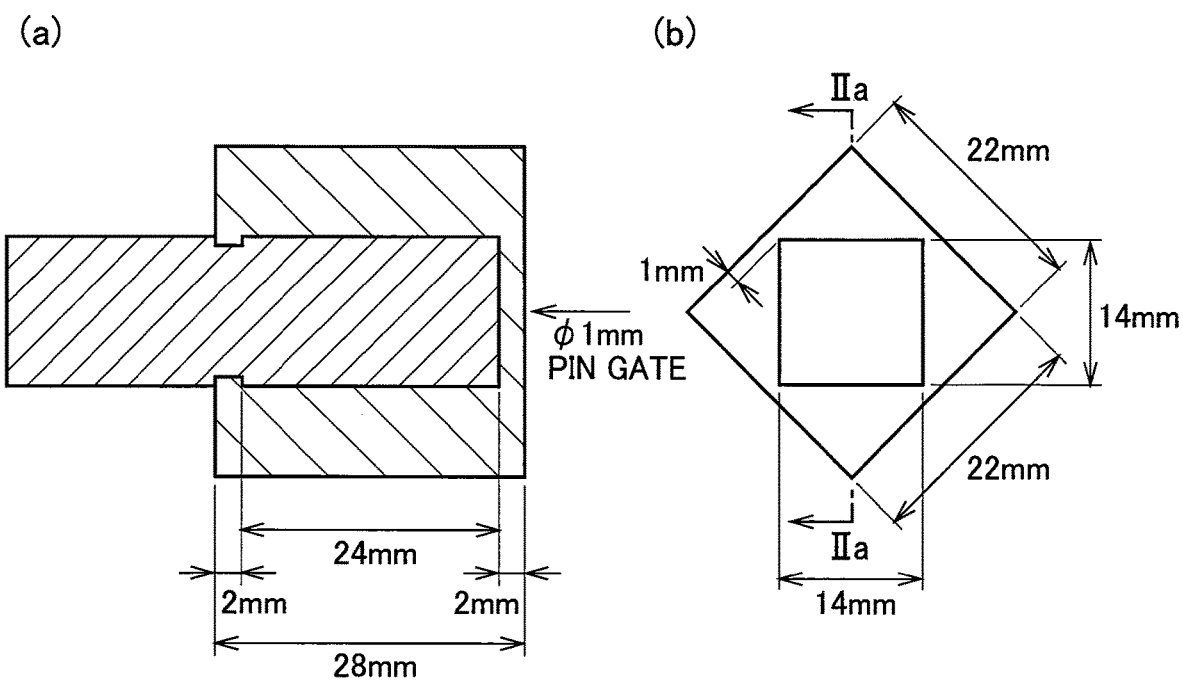
FIG. 2 is a series of diagrams illustrating the insert molded article shown in FIG. 1, wherein (b) is a top view, and (a) is a cross-sectional view along the line IIa-IIa in (b).

Using the pellets described above, an insert molded article was produced by using a mold for test piece molding (a mold for inserting, into a prism-shaped interior with a length of 22 mm, a width of 22 mm and a height of 28 mm, an iron core with a length of 14 mm, a width of 14 mm and a height of 24 mm) to perform insert injection molding, so that the minimum wall thickness in part of the resin portion was 1 mm, under conditions including a resin temperature of 260° C., a mold temperature of 65° C., an injection time of 25 seconds and a cooling time of 10 seconds. The thus produced insert molded article is illustrated in FIG. 1 and FIG. 2. The insert molded article 10 shown in FIG. 1 is illustrated in perspective view, showing the insert molded article having the iron core 14 inserted in the resin portion 12, and FIG. 2 illustrates additional views of the inserted molded article, with (a) illustrating a cross-sectional view (a cross-sectional view along the line IIa-IIa in (b)), and (b) illustrating a top view. As illustrated in FIG. 2(a), the portion of the iron core 10 from 24 to 26 mm from the bottom surface of the core is a circular cylindrical shape. As illustrated in FIG. 2(b), the minimum wall thickness of the resin portion 12 surrounding the iron core 14 is 1 mm. The pin gate used for injecting the resin is in a central location in the bottom surface of the resin portion illustrated by an arrow in FIG. 2(a). The obtained insert molded article was subjected to heat shock resistance testing using a thermal shock tester in which the process of heating at 140° C. for 1 hour and 30 minutes, subsequently lowering the temperature to −40° C. and performing cooling for 1 hour and 30 minutes, and then raising the temperature back to 140° C. was deemed one cycle, and the number of cycles performed before cracking appeared in the molded article was measured. The average fracture life was determined across five samples, and this average value was used to evaluate the heat shock resistance.

[Heat Shock Resistance (L-Shaped Plate-Like Member)]

Figure 3:
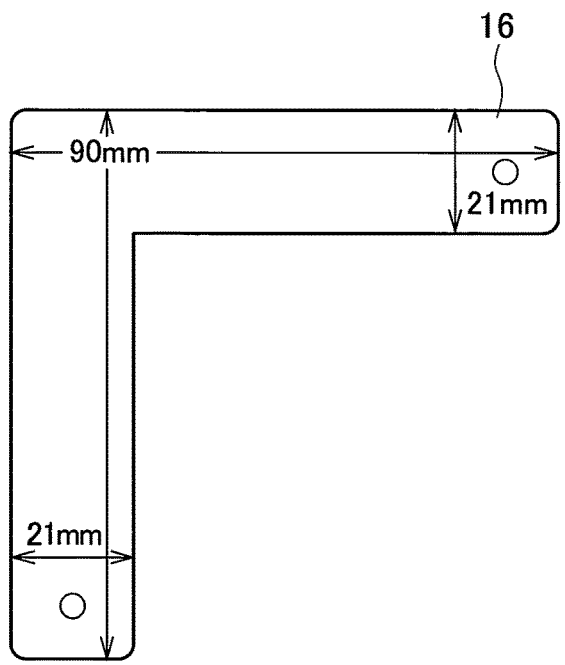
FIG. 3 is a top view illustrating a plate-like (L-shaped) insert member produced in a heat shock resistance evaluation in the examples.
Figure 4:
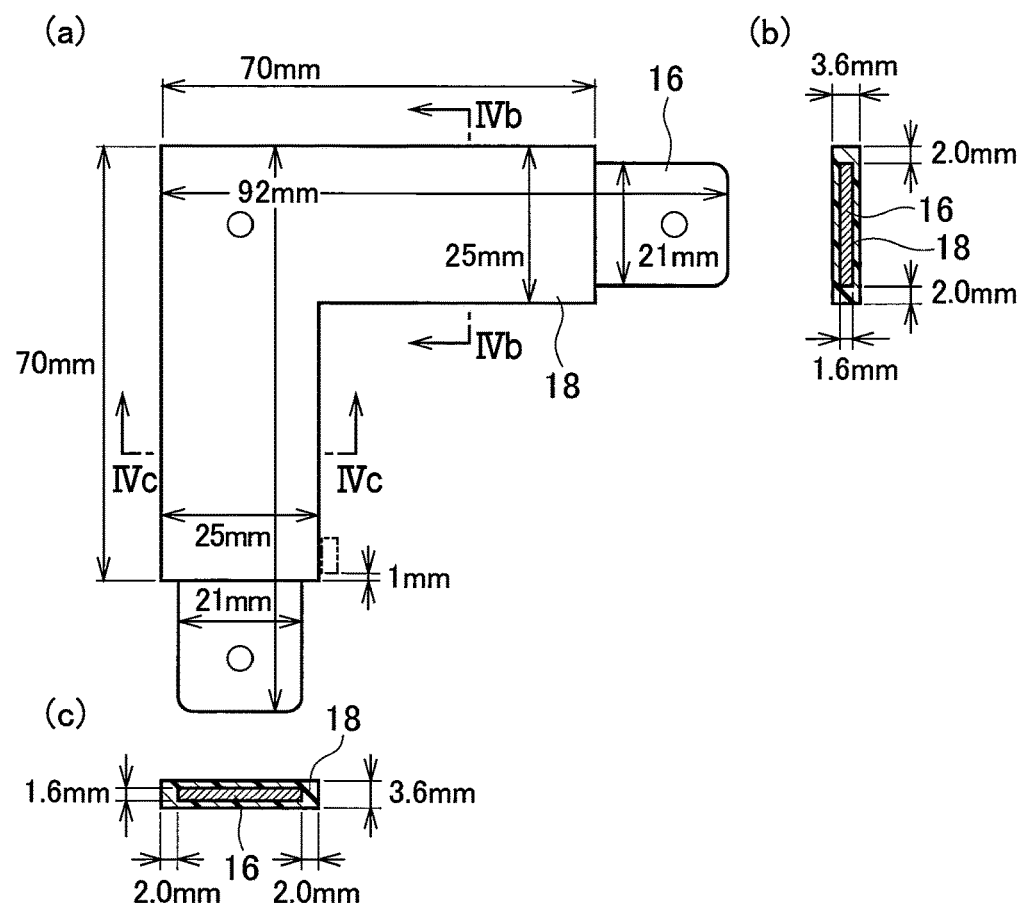
FIG. 4 is a series of diagrams illustrating an insert molded article using the plate-like (L-shaped) insert member shown in FIG. 3, wherein (a) is a top view, (b) is a cross-sectional view along the line IVb-IVb in (a), and (c) is a cross-sectional view along the line IVc-IVc in (a).

Using the pellets described above, an insert molded article was produced by using a mold for test piece molding (a mold for inserting, into an L-shaped plate-like member interior with 25 mm in a width×70 mm×70 mm and a thickness of 3.6 mm, an L-shaped iron plate with 21 mm in a width×90 mm×90 mm and a thickness of 1.6 mm (cross sectional width/thickness ratio of 13.1)) to perform insert injection molding, so that the minimum wall thickness in part of the resin portion was 1 mm, under conditions including a resin temperature of 260° C., a mold temperature of 65° C., an injection time of 25 seconds and a cooling time of 10 seconds. The L-shaped plate-like member used and the produced insert molded article are illustrated in FIG. 3 and FIG. 4 respectively. FIG. 3 illustrates a top view of the L-shaped plate-like member 16, and FIG. 4 illustrates a top view ((a)) and cross-sectional views ((b), (c)) of the insert molded article having the L-shaped plate-like member 16 inserted in the resin portion 18. The two holes formed near the two ends of the L-shaped member are to be engaged with pins within the mold to secure the L-shaped member. The hole in the resin portion 18 shown in FIG. 4 is formed when a pin inside the mold is pressed against the L-shaped plate-like member 16 to secure the member, and the resin then flows around that pin when resin filling is performed. The position of a side gate (width: 4 mm, thickness: 3 mm) for injecting the resin is illustrated by a dotted line in FIG. 4(a), The side gate is positioned 1 mm above the right-side bottom end of the resin portion 18. The obtained insert molded article was subjected to heat shock resistance testing using a thermal shock tester in which the process of heating at 140° C. for 1 hour and 30 minutes, subsequently lowering the temperature to −40° C. and performing cooling for 1 hour and 30 minutes, and then raising the temperature back to 140° C. was deemed one cycle, and the number of cycles performed before cracking appeared in the molded article was measured. The average fracture life was determined across five samples, and this average value was used to evaluate the heat shock resistance.

[Heat Shock Resistance (I-Shaped Plate-Like Member)]

Figure 5:
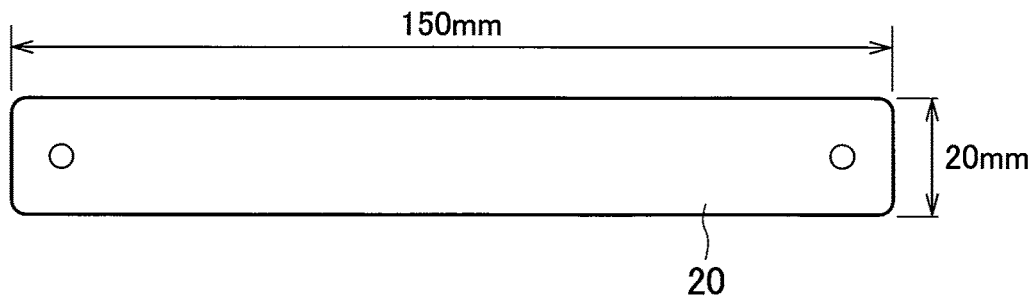
FIG. 5 is a top view illustrating a plate-like (I-shaped) insert member produced in a heat shock resistance evaluation in the examples.
Figure 6:
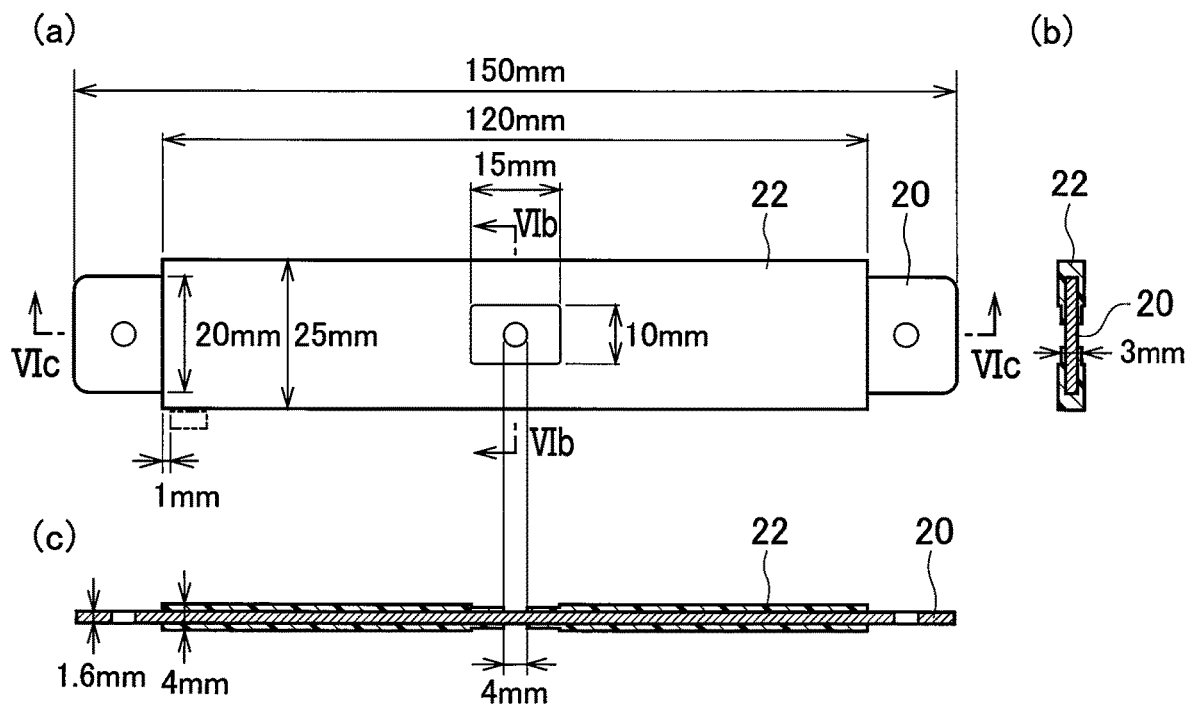
FIG. 6 is a series of diagrams illustrating an insert molded article using the plate-like (I-shaped) insert member shown in FIG. 5, wherein (b) is a cross-sectional view along the line VIb-VIb in (a), and (c) is a cross-sectional view along the line VIc-VIc in (a).

Using the pellets described above, an insert molded article was produced by using a mold for test piece molding (a mold for inserting, into an I-shaped plate-like member interior with 25 mm in a width×120 mm and a thickness of 4 mm, an I-shaped iron plate with 20 mm in a width×150 mm and a thickness of 1.6 mm (cross sectional width/thickness ratio of 12.5)) to perform insert injection molding, so that the minimum wall thickness in part of the resin portion was 1 mm, under conditions including a resin temperature of 260° C., a mold temperature of 65° C., an injection time of 25 seconds and a cooling time of 10 seconds. The I-shaped plate-like member used and the produced insert molded article are illustrated in FIG. 5 and FIG. 6 respectively. FIG. 5 illustrates a top view of the I-shaped plate-like member 20, and FIG. 6 illustrates a top view ((a)) and cross-sectional views ((b), (c)) of the insert molded article having the I-shaped plate-like member 20 inserted in the resin portion 22. The two holes formed near the two ends of the I-shaped member are to be engaged with pins within the mold to secure the I-shaped member. The hole in the resin portion 22 shown in FIG. 6 is formed when a pin inside the mold is pressed against the I-shaped plate-like member 20 to secure the member, and the resin then flows around that pin when resin filling is performed. The position of a side gate (width: 4 mm, thickness: 3 mm) for injecting the resin is illustrated by a dotted line in FIG. 6(a). The side gate is positioned 1 mm to the right of the bottom-side left end of the resin portion 22. The obtained insert molded article was subjected to heat shock resistance testing using a thermal shock tester in which the process of heating at 140° C. for 1 hour and 30 minutes, subsequently lowering the temperature to −40° C. and performing cooling for 1 hour and 30 minutes, and then raising the temperature back to 140° C. was deemed one cycle, and the number of cycles performed before cracking appeared in the molded article was measured. The average fracture life was determined across five samples, and this average value was used to evaluate the heat shock resistance.

[Hydrolysis Resistance]

Test pieces used for measuring the tensile strength were treated for 96 hours in a pressure cooker test device at 121° C. and 100% RH, and every 24 hours during the treatment, a treated test piece was measured for tensile strength, and the strength retention ratio of before and after treatment was determined.

TABLE 1

|  |  |  | Example | | | |
|---|---|---|---|---|---|---|
|  |  |  | 1 | 2 | 3 | 4 |
| (A) Polyalkylene terephthalate resin | | | 100 | 100 | 100 | 100 |
| (B) Acrylic-based core-shell polymer | | | B-1 | B-2 | B-3 | B-10 |
|  |  |  | 17 | 17 | 17 | 17 |
| (C) Glass fiber | | | 51 | 51 | 51 | 51 |
| Antioxidant | | | 0.5 | 0.5 | 0.5 | 0.5 |
| Hydrolysis resistance improver | | | 1.7 | 1.7 | 1.7 | 1.7 |
| Physical properties | Melt viscosity | kPa·s | 0.21 | 0.26 | 0.22 | 0.22 |
|  | Tensile strength | MPa | 126 | 132 | 134 | 128 |
|  | Tensile breaking strain | % | 2.6 | 2.5 | 2.4 | 2.6 |
|  | Charpy impact strength | kJ/m$^2$ | 13.0 | 12.5 | 12.1 | 13.1 |
| Heat shock resistance | Average fracture life (cycles) | Prism | 545 | 310 | 292 | 534 |
|  |  | Plate (L-shape) | 171 | 147 | 101 | 152 |
|  |  | Plate (I-shape) | 57 | 68 | 42 | 60 |
| Hydrolysis resistance | Tensile strength retention ratio after PCT treatment (%) | Treatment time (hr) | | | | |
|  |  | 0 | 100% | 100% | 100% | 100% |
|  |  | 24 | 95% | 92% | 93% | 95% |
|  |  | 48 | 90% | 85% | 86% | 91% |
|  |  | 72 | 74% | 63% | 69% | 77% |
|  |  | 96 | 56% | 42% | 49% | 60% |

|  |  |  | Comparative Example | | | | | |
|---|---|---|---|---|---|---|---|---|
|  |  |  | 1 | 2 | 3 | 4 | 5 | 6 |
| (A) Polyalkylene terephthalate resin | | | 100 | 100 | 100 | 100 | 100 | 100 |
| (B) Acrylic-based core-shell polymer | | | B-4 | B-5 | B-6 | B-7 | B-8 | B-9 |
|  |  |  | 17 | 17 | 17 | 17 | 17 | 17 |
| (C) Glass fiber | | | 51 | 51 | 51 | 51 | 51 | 51 |
| Antioxidant | | | 0.5 | 0.5 | 0.5 | 0.5 | 0.5 | 0.5 |
| Hydrolysis resistance improver | | | 1.7 | 1.7 | 1.7 | 1.7 | 1.7 | 1.7 |
| Physical properties | Melt viscosity | kPa·s | 0.20 | 0.20 | 0.20 | 0.20 | 0.20 | 0.20 |
|  | Tensile strength | MPa | 122 | 122 | 122 | 130 | 128 | 125 |
|  | Tensile breaking strain | % | 2.9 | 3.1 | 3.0 | 2.4 | 2.6 | 2.8 |
|  | Charpy impact strength | kJ/m$^2$ | 12.0 | 12.2 | 12.4 | 11.5 | 11.2 | 11.2 |
| Heat shock resistance | Average fracture life (cycles) | Prism | 96 | 181 | 199 | 327 | 457 | 442 |
|  |  | Plate (L-shape) | 40 | 38 | 52 | 52 | 64 | 81 |
|  |  | Plate (I-shape) | 20 | 20 | 20 | 40 | 45 | 40 |
| Hydrolysis resistance | Tensile strength retention ratio after PCT treatment (%) | Treatment time (hr) | | | | | | |
|  |  | 0 | 100% | 100% | 100% | 100% | 100% | 100% |
|  |  | 24 | 93% | 94% | 93% | 93% | 93% | 94% |
|  |  | 48 | 92% | 92% | 91% | 85% | 88% | 90% |
|  |  | 72 | 78% | 78% | 77% | 70% | 71% | 73% |
|  |  | 96 | 63% | 61% | 61% | 50% | 52% | 56% |

As is evident from Table 1, by using an acrylic-based core-shell polymer which has an average particle size of 2 µm or greater and in which the amount of the core layer component is more than 80% by mass relative to the total mass of the core layer component and the shell layer component, the heat shock resistance is able to be dramatically improved without significantly impairing the impact resistance (Examples 1 to 4). When the average particle size is less than 2 µm, the heat shock resistance does not necessarily improve (Comparative Examples 1 to 3). Further, even if the average particle size is large, in those cases where the amount of the core layer component is 80% by mass or less (Comparative Examples 4 to 6), although no significant difference from the case where the amount of the core layer component exceeds 80% by mass is observed for the prism-shaped insert member, a marked difference in the heat shock resistance can be seen for the plate-shaped insert members. Moreover, the results suggest a tendency for the heat shock resistance, the impact resistance and the hydrolysis resistance to also deteriorate if the average particle size becomes too large, indicating that it is difficult to predict the results obtained by specifying a particle size within the range of the present invention.

Further, when the acrylic-based core-shell polymer has a reactive functional group, the obtained polyalkylene terephthalate resin composition not only exhibits excellent impact resistance and heat shock resistance, but also has superior hydrolysis resistance (Example 4).

The entire content of prior Japanese Patent Application 2014-265294 is incorporated within the present description by reference.

All publications, patent applications and technical standards mentioned in this specification are herein incorporated by reference to the same extent as if such individual publication, patent application or technical standard was specifically and individually indicated to be incorporated by reference.

DESCRIPTION OF THE REFERENCE SIGNS

10: Insert molded article
12, 18, 22: Resin portion
14: Iron core
16: L-shaped plate-like member
20: I-shaped plate-like member

The invention claimed is:
1. An insert molded article obtained by performing insert molding using a polyalkylene terephthalate resin composition and an insert member comprising a metal or an inorganic solid, wherein the polyalkylene terephthalate resin composition comprises (A) a polyalkylene terephthalate resin, and (B) an acrylic-based core-shell polymer which has an average particle size of 2 μm or greater and in which an amount of a core layer component is at least 85% by mass but not more than 95% by mass relative to a total mass of the core layer component and a shell layer component, an amount of (B) the acrylic-based core-shell polymer is at least 10 parts by mass but not more than 30 parts by mass per 100 parts by mass of (A) the polyalkylene terephthalate resin, the polyalkylene terephthalate resin composition further comprises (C) a filler in an amount of at least 10 parts by mass but not more than 100 parts by mass per 100 parts by mass of (A) the polyalkylene terephthalate resin, (A) the polyalkylene terephthalate resin comprises a polybutylene terephthalate resin, the core layer component of (B) the acrylic-based core-shell polymer comprises a polymer formed using a $C_1$ to $C_{12}$ alkyl acrylate, the shell layer component of (B) the acrylic-based core-shell polymer comprises a polymer formed using a $C_1$ to $C_{20}$ alkyl methacrylate, and the polyalkylene terephthalate resin composition is a composition wherein, when the following insert molded article A is produced, the insert molded article A satisfies the following heat shock resistance condition A, wherein insert molded article A: an insert molded article into which an L-shaped iron plate with 21 mm in a width× 90 mm×90 mm and a thickness of 1.6 mm is inserted, and in which a resin portion is an L-shaped plate with 25 mm in a width×70 mm×70 mm and a thickness of 3.6 mm, in which a minimum wall thickness in part of the resin portion is 1 mm, and heat shock resistance condition A: in a heat shock resistance test using a thermal shock tester in which a process of performing heating at 140° C. for 1 hour and 30 minutes, subsequently lowering a temperature to −40° C. and performing cooling for 1 hour and 30 minutes, and then raising a temperature back to 140° C. is deemed one cycle, a number of cycles performed before cracking appears in the molded article is at least 100, and the insert member is a plate-like electrical connection conductor, and the insert member has a ratio of 12.5 or greater for a maximum width relative to a maximum thickness in a cross-section perpendicular to a lengthwise direction of a planar surface of the plate-like conductor.

2. The insert molded article according to claim 1, wherein the average particle size of the component (B) is at least 2.5 μm but not more than 20 μm, and the amount of the core layer component is at least 85% by mass but not more than 95% by mass relative to the total mass of the core layer component and the shell layer component.

3. The insert molded article according to claim 1, wherein the average particle size of the component (B) is at least 3 μm but not more than 10 μm, and the amount of the core layer component is at least 90% by mass but not more than 92% by mass relative to the total mass of the core layer component and the shell layer component.

4. The insert molded article according to claim 1, wherein the average particle size of the component (B) is about 3 μm, and the amount of the core layer component is about 90% by mass relative to the total mass of the core layer component and the shell layer component.

5. The insert molded article according to claim 1, wherein the polyalkylene terephthalate resin composition is a composition wherein, when the following insert molded article B is produced, the insert molded article B satisfies the following heat shock resistance condition B, wherein insert molded article B: an insert molded article into which an I-shaped iron plate with 20 mm in a width× 150 mm and a thickness of 1.6 mm is inserted, and in which a resin portion is an I-shaped plate with a 25 mm in a width×120 mm and a thickness of 4 mm, in which a minimum wall thickness in part of the resin portion is 1 mm, and heat shock resistance condition B: in a heat shock resistance test using a thermal shock tester in which a process of performing heating at 140° C. for 1 hour and 30 minutes, subsequently lowering a temperature to −40° C. and performing cooling for 1 hour and 30 minutes, and then raising a temperature back to 140° C. is deemed one cycle, a number of cycles performed before cracking appears in the molded article is at least 40.

6. An insert molded article obtained by performing insert molding using a polyalkylene terephthalate resin composition and an insert member comprising a metal or an inorganic solid, wherein:

the polyalkylene terephthalate resin composition comprises (A) a polyalkylene terephthalate resin, and (B) an acrylic-based core-shell polymer which has an average particle size of 2 μm or greater and in which an amount of a core layer component is at least 85% by mass but not more than 95% by mass relative to a total mass of the core layer component and a shell layer component, an amount of (B) the acrylic-based core-shell polymer is at least 10 parts by mass but not more than 30 parts by mass per 100 parts by mass of (A) the polyalkylene terephthalate resin, the polyalkylene terephthalate resin composition further comprises (C) a filler in an amount of at least 10 parts by mass but not more than 100 parts by mass per 100 parts by mass of (A) the polyalkylene terephthalate resin, (A) the polyalkylene terephthalate resin comprises a polybutylene terephthalate resin, the core layer component of (B) the acrylic-based core-shell polymer comprises a polymer formed using a $C_1$ to $C_{12}$ alkyl acrylate, the shell layer component of (B) the acrylic-based core-shell polymer comprises a polymer formed using a $C_1$ to $C_{20}$ alkyl methacrylate, and the polyalkylene terephthalate resin composition is a composition wherein, when the following insert molded article B is produced, the insert molded article B satisfies the following heat shock resistance condition B, wherein insert molded article B: an insert molded article into which an I-shaped iron plate with 20 mm in a width× 150 mm and a thickness of 1.6 mm is inserted, and in which a resin portion is an I-shaped plate with a 25 mm in a width×120 mm and a thickness of 4 mm, in which a minimum wall thickness in part of the resin portion is 1 mm, and heat shock resistance condition B: in a heat shock resistance test using a thermal shock tester in which a process of performing heating at 140° C. for 1 hour and 30 minutes, subsequently lowering a temperature to −40° C. and performing cooling for 1 hour and 30 minutes, and then raising a temperature back to 140° C.

is deemed one cycle, a number of cycles performed before cracking appears in the molded article is at least 40, and the insert member is a plate-like electrical connection conductor, and the insert member has a ratio of 12.5 or greater for a maximum width relative to a maximum thickness in a cross-section perpendicular to a lengthwise direction of a planar surface of the plate-like conductor.

7. The insert molded article according to claim 6, wherein the average particle size of the component (B) is at least 2.5 μm but not more than 20 μm, and the amount of the core layer component is at least 85% by mass but not more than 95% by mass relative to the total mass of the core layer component and the shell layer component.

8. The insert molded article according to claim 6, wherein the average particle size of the component (B) is at least 3 μm but not more than 10 μm, and the amount of the core layer component is at least 90% by mass but not more than 92% by mass relative to the total mass of the core layer component and the shell layer component.

9. The insert molded article according to claim 6, wherein the average particle size of the component (B) is about 3 μm, and the amount of the core layer component is about 90% by mass relative to the total mass of the core layer component and the shell layer component.

10. The insert molded article according to claim 6, wherein the polyalkylene terephthalate resin composition is a composition wherein, when the following insert molded article A is produced, the insert molded article A satisfies the following heat shock resistance condition A, wherein insert molded article A: an insert molded article into which an L-shaped iron plate with 21 mm in a width×90 mm×90 mm and a thickness of 1.6 mm is inserted, and in which a resin portion is an L-shaped plate with 25 mm in a width×70 mm×70 mm and a thickness of 3.6 mm, in which a minimum wall thickness in part of the resin portion is 1 mm, and heat shock resistance condition A: in a heat shock resistance test using a thermal shock tester in which a process of performing heating at 140° C. for 1 hour and 30 minutes, subsequently lowering a temperature to −40° C. and performing cooling for 1 hour and 30 minutes, and then raising a temperature back to 140° C. is deemed one cycle, a number of cycles performed before cracking appears in the molded article is at least 100.

\* \* \* \* \*